Jan. 2, 1951 A. HAGEN 2,536,545
TRAP
Filed Jan. 23, 1947 2 Sheets-Sheet 1

Inventor
Asbjorn Hagen

Jan. 2, 1951 A. HAGEN 2,536,545
TRAP
Filed Jan. 23, 1947 2 Sheets-Sheet 2

Inventor
Asbjorn Hagen

Patented Jan. 2, 1951

2,536,545

UNITED STATES PATENT OFFICE 2,536,545

TRAP

Asbjorn Hagen, Kississing, Manitoba, Canada

Application January 23, 1947, Serial No. 723,771

1 Claim. (Cl. 43—92)

This invention relates to improvements in traps.

An object of the invention is to provide an improved form of animal trap which will include a pair of spring tensioned pivoted jaws and a releasable latch treadle or "pan" which will spring the trap when stepped upon by an animal.

Another object of the invention is to provide an improved form of animal trap including a pair of resiliently tensioned clamping jaws and a leaf spring for closing the same when the jaws are sprung from set position by an animal stepping upon a releasable latch treadle.

Another object of the invention is to provide an improved spring operated pivoted jaw animal trap which will be highly efficient in operation, and relatively inexpensive to manufacture and produce.

Other objects will appear as the description proceeds.

In the accompanying drawings which form a part of this application:

Like characters of reference are used throughout the following specification and the accompanying drawings to designate corresponding parts.

Figure 1:
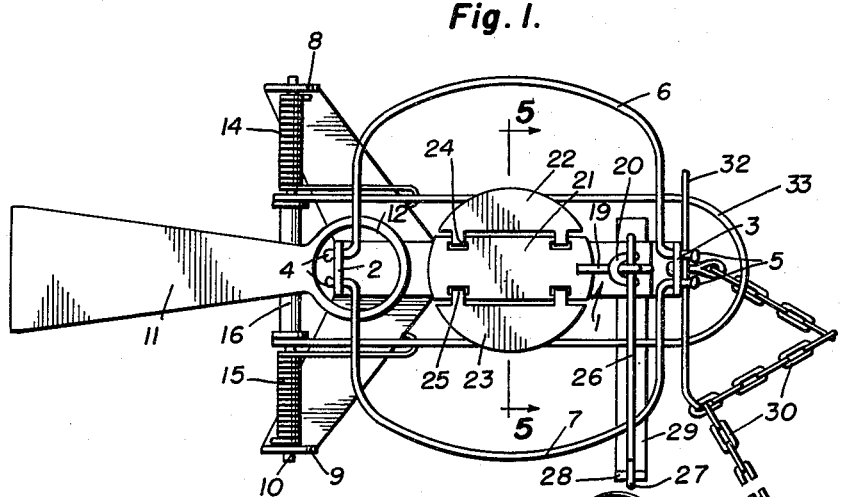
Figure 1 is a plan view of the improved trap showing the same in set position.
Figure 2:
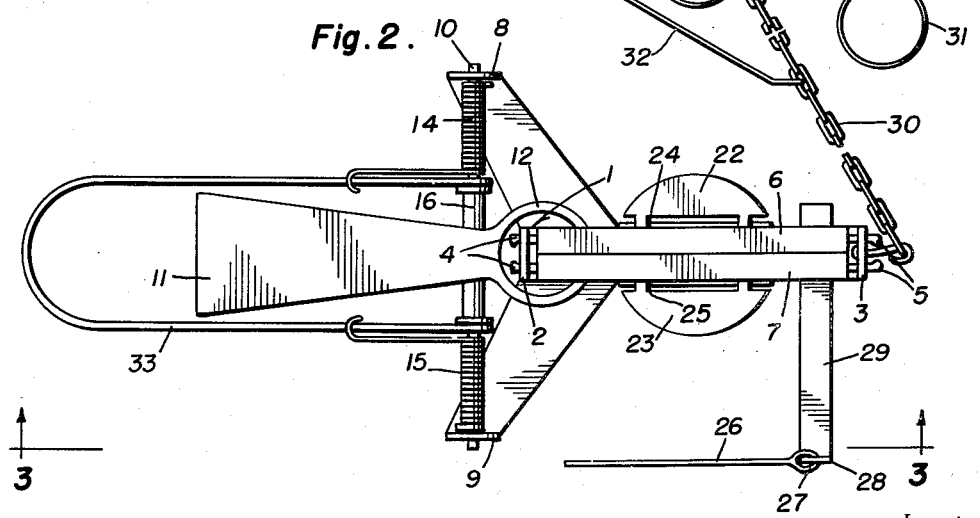
Figure 2 is a plan view of the improved trap showing the same in sprung or released position.

In carrying out the invention, there is provided an improved animal trap having a substantially Y-shaped body or frame generally denoted by the reference numeral 1. The opposite ends of the base of the body are bent upwardly to provide the ears 2 and 3, and are apertured to receive the oppositely extending pivoted ends 4 and 5 of the U-shaped clamping jaws 6 and 7.

The opposite ends of the laterally extending frame arms are bent upwardly to provide the ears 8 and 9 and are apertured to support the pivot pin 10 extending therebetween.

Figure 3:
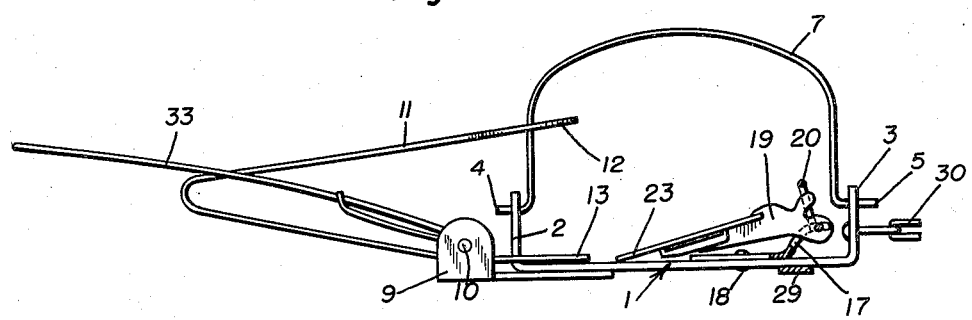
Figure 3 is a side elevation of the improved trap as taken on the line 3—3 of Figure 2.
Figure 4:
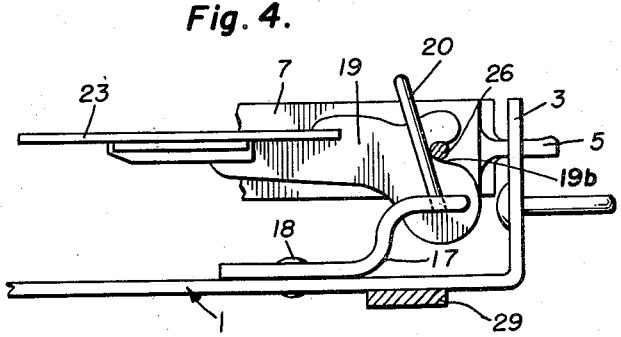
Figure 4 is an enlarged detail view of the trap locking mechanism.
Figure 5:
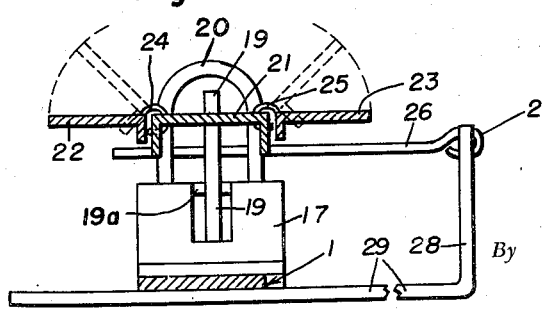
Figure 5 is a sectional view with parts omitted taken on the line 5—5 of Figure 1.

The V-shaped leaf spring 11 is formed with the rings 12 and 13 at its opposite ends, the same being adapted to fit about the adjacent ends of the clamping jaws 6 and 7 and about the upstanding ears 2 and 3 respectively, the lower arm of said spring 11 being disposed below the pivot pin 10, as clearly shown in Figure 3 of the drawings.

A U-shape action guard 33 is pivotally supported upon the pivot rod 10 and extends longitudinally of the frame 1 when it is swung against the tension of the coil springs 14 and 15 disposed about the outer ends of the pivot pin 10, being disposed beneath the clamping jaws 6 and 7 when the trap is in set position.

The outer ends of the coil springs 14 and 15 are secured to the ends of the laterally extending frame arms, while their inner ends are extended outwardly to engage and hook over the side arms of the action guard 33.

A spacing collar 16 will be disposed about the pivot pin 10 between the pivotal ends of said guard or jaw 33.

A bifurcated supporting bracket or arm 17 is riveted at 18 to the frame 1 adjacent the end remote from the pivot pin 10 and supports laterally extending trunnions 19a of an arm 19. An inverted U-shaped pivot member 20 is rigidly secured to the top of the arm 17 and in turn supports the latch releasing treadle or pan generally denoted by the reference numeral 21. The central portion of the treadle or pan 21 supports the oppositely disposed side plates 22 and 23, the same being hinged at 24 and 25 to said treadle or pan 21.

The rear end of the arm 19 is formed with a locking notch 19b which is adapted to receive the inner end of the treadle or pan locking pin 26 which is pivoted at 27 on the upturned end 28 of the laterally extending arm 29, whereby the treadle or pan will be maintained in open position until being released by an animal stepping on the same. The function of the member 20 is that of an abutment member against which the locking pin 26 bears while this locking pin is engaged in the notch 19b in the end of the arm 19 while the treadle 23 is in set position.

A trap securing chain 30 is fastened to an end of the main trap body or frame 1 and is provided with a ring 31 at its outer end for attaching the trap to any desired fixed object (not shown).

A delayed action bar or pin 32 is secured to the chain 30 at any suitable slack point and is adapted to be inserted between the inner chain link and under the rearwardly extending terminal ends of the clamping jaws 6 and 7 when the trap is set, whereby any movement or pull on the chain by the animal will pull the bar or pin and release or spring the guard.

In operation, the guard is first pulled over against its tension springs, after which the clamping jaws are opened and the treadle or pan supported in raised position by means of the locking pin 26, and the delayed action bar or pin 32 is secured in place. When an animal steps on the treadle, the pin 26 is released, permitting the treadle to drop, and the ring 12 of the spring 11 snaps the clamping jaws together upon the animal's foot or leg. The trapped animal in attempting to move the trap transmits this movement to the chain, which in turn pulls the bar or pin 32 from beneath the terminal ends of the jaws releasing the guard 33. Since the trap is tethered, it cannot be pulled away or lost.

While the preferred embodiment of the instant invention has been illustrated and described, it will be understood that many minor changes in detail of construction may be resorted to without departure from the spirit of the invention.

Having thus described my invention, what I claim as new and desire to secure by Letters Patent of the United States is:

A trap formed with a substantially Y-shaped body or frame having the opposite ends of the body and the outer ends of the side arms thereof bent upwardly and apertured, a pivot rod mounted between the outer ends of said side arms, a U-shaped guard pivotally mounted on said pivot rod, coil tensioning springs on the outer ends of said pivot arms connected respectively with said side arms and the arms of said guard and biasing the guard to pivot upwardly, U-shaped clamping jaws pivotally mounted between the opposite bent up ends of said body, a bifurcated bracket on said body, an inverted U-shaped bracket rigidly secured to the bifurcated end of said bifurcated bracket, a sectional treadle or pan on said arm, said arm having a notch, a locking pin engaged in said notch and bearing against said U-shaped bracket for holding said treadle or pan in set position and releasable when the treadle is depressed, said U-shaped bracket extending above said pin and notch, and a leaf trap spring having one end secured to the frame and having the other end returned and apertured to receive portions of said jaws to bias the jaws into closed position, said guard being below said jaws when the guard is in set position, said guard being also below said treadle when the trap is set, and a pair of oppositely disposed side plates hinged to said treadle to increase the effective area thereof when the trap is set and allowing the guard to pivot upwardly above the treadle when the trap is sprung and the guard released.

ASBJORN HAGEN.

REFERENCES CITED

The following references are of record in the file of this patent:

UNITED STATES PATENTS

| Number | Name | Date |
|---|---|---|
| 1,000,007 | Jackson | Aug. 8, 1911 |
| 1,256,973 | Bedard | Feb. 19, 1918 |
| 1,459,661 | Gravolet et al. | June 19, 1923 |
| 2,216,665 | Gibbs | Oct. 1, 1940 |
| 2,282,485 | Lehn | May 12, 1942 |